United States Patent [19]
Danielsson et al.

[11] Patent Number: 5,924,330
[45] Date of Patent: Jul. 20, 1999

[54] INDUSTRIAL ROBOT WRIST UNIT

[75] Inventors: Stefan Danielsson; Jan Gepertz; Jan Larsson, all of Västerås, Sweden

[73] Assignee: Asea Brown Boveri AB, Vasteras, Sweden

[21] Appl. No.: 08/875,687

[22] PCT Filed: Jan. 26, 1996

[86] PCT No.: PCT/SE96/00085

§ 371 Date: Jul. 24, 1997

§ 102(e) Date: Jul. 24, 1997

[87] PCT Pub. No.: WO96/22860

PCT Pub. Date: Aug. 1, 1996

[30] Foreign Application Priority Data

Jan. 27, 1995 [SE] Sweden ................................. 9500296

[51] Int. Cl.⁶ ................................. B25J 17/02; B25J 9/10
[52] U.S. Cl. ................................. 74/490.06; 74/490.01; 74/396; 901/26
[58] Field of Search ........................... 74/490.01, 490.06, 74/396, 399; 901/25, 29, 26

[56] References Cited

U.S. PATENT DOCUMENTS

| | | |
|---|---|---|
| 4,690,012 | 9/1987 | Dahlquist et al. ........................ 901/26 |
| 4,807,486 | 2/1989 | Akeel et al. . |
| 5,119,687 | 6/1992 | Naruoka et al. . |
| 5,456,132 | 10/1995 | Iwanaga et al. ...................... 74/490.06 |
| 5,549,016 | 8/1996 | Nakako et al. ........................ 74/490.06 |
| 5,775,171 | 7/1998 | Richter ....................................... 901/29 |

FOREIGN PATENT DOCUMENTS

| | | |
|---|---|---|
| 3736355 | 5/1988 | Germany . |
| 53-78554 | 12/1978 | Japan . |

*Primary Examiner*—Charles A Marmor
*Assistant Examiner*—David Fenstermacher
*Attorney, Agent, or Firm*—Watson Cole Grindle Watson, P.L.L.C.

[57] ABSTRACT

A wrist unit for an industrial robot comprises a wrist housing detachably mounted to a distal end of a robot arm, the wrist housing containing rotatably mounted first and second, parallel, secondary drive shafts on the input ends of which are mounted cylindrical driven gears for engagement with the respective cylindrical drive gears located on primary drive shafts on the robot arm. The driven gears and the drive gears are so disposed that an imaginary line extending through the centers of the gears are offset from the center axis of the coaxial drive gears, the wrist housing being radially adjustable on the end of the robot arm for adjusting the gear clearance between the drive gears and the driven gears.

3 Claims, 1 Drawing Sheet

INDUSTRIAL ROBOT WRIST UNIT

BACKGROUND OF THE INVENTION

The present invention relates to an industrial robot wrist unit, comprising a wrist housing, which is intended to be detachably fixed to a distal end of a robot arm and in which there is pivotally mounted a tilt housing, which in turn supports a rotatably mounted turntable on which there can be mounted an external tool, first and second secondary drive shafts being rotatably mounted in the wrist housing, the first and second secondary drive shafts each having an input end which supports a gear for engagement with a respective drive gear on a respective primary drive shaft in the robot arm, the drive gears being disposed coaxial to each other and axially spaced, and where the first secondary drive shaft via a respective first gearing can rotate the turntable about a first axis and the second secondary drive shaft can, via a respective second gearing, pivot the tilt housing about a second axis, which crosses the first axis.

In a previously known wrist unit of the above mentioned type, the wrist housing comprises two halves, where each half has a through-hole for a respective secondary drive shaft. When assembled, the center axes of the holes for the secondary drive shafts in the housing halves, and thereby the center axis of the gears thereon, are disposed on diametrically opposite sides of the central coaxial driving gears on the primary drive shafts in the robot arm with which they are in engagement. In other words a straight line extends through the center axes of the secondary gears and the coaxial drive gears. This has made it difficult to adjust the clearance between the drive gears and their respective gears on the secondary drive shafts.

SUMMARY OF THE INVENTION

A primary purpose of the present invention is to suggest a wrist unit in which the aforementioned gear clearance can be easily adjusted. This is achieved by a wrist unit of the general type in which the gears and the drive gears (as seen in an end view projection) are placed relative to each other so that an imaginary line, extending through the centers of the gears, is offset from the centerline through the gears and that the wrist housing is radially adjustably fixable on the end of the robot arm for adjusting the gear clearance between, on the one hand, the drive gears on the primary drive shafts and, on the other hand, the gears on the secondary drive shafts.

BRIEF DESCRIPTION OF THE DRAWINGS

The invention will be described in more detail below with reference to the accompanying drawing, in which.

DETAILED DESCRIPTION OF THE INVENTION

Figure 1:
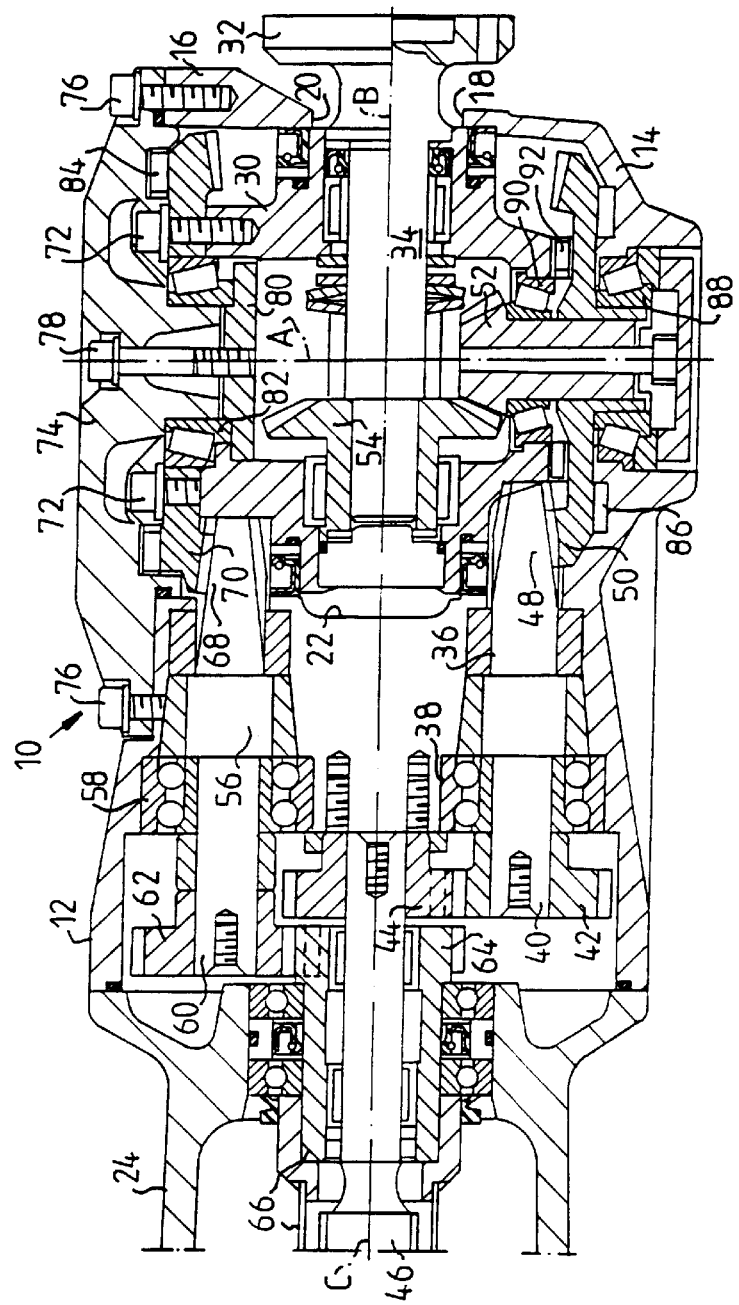
FIG. 1 is a partially sectioned longitudinal view of a wrist unit in accordance with the invention, mounted on a distal end of a robot arm.

With reference to FIG. 1, there is shown a wrist generally designated 10, for an industrial robot in accordance with the invention. The wrist 10 comprises in principle, a distal, fork-shaped wrist housing 12 with two fork arms 14 and 16, defining between them a groove-shaped space, the side walls 18,20 and bottom wall 22 of which are indicated in FIG. 1.

Figure 2:
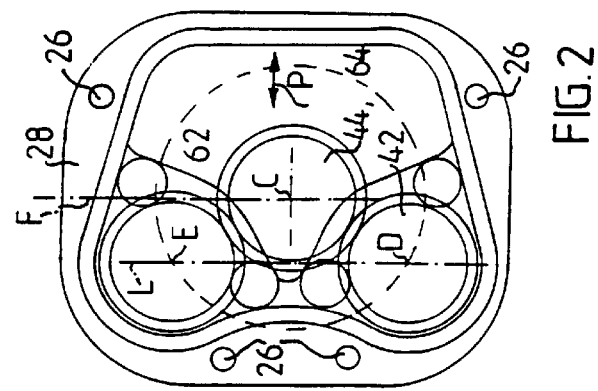
FIG. 2 is an end view of the wrist unit shown in FIG. 1 as seen from the end of the robot arm.

The wrist housing 12 is intended to be mounted on the distal end of a robot arm 24 by means of screw fasteners (not shown). FIG. 2 shows, however, four through-holes 26 for the anchoring screws in an anchoring flange 28 of the housing 12.

In the wrist housing 12 there is a so-called tilt housing 30 pivotally mounted about a transverse axis A and which supports in a manner known per se a turntable 32, which is rotatably mounted about a longitudinally oriented axis B. On the turntable 32 there can be mounted a chosen tool (not shown), such as a welding unit, gripping means, a spray-painting nozzle or the like. The portion of the tilt housing 30 supporting the turntable 32 and its shaft 34 is thus pivotable about the axis A in the space between the fork arms 14,16 through an arc of less than 360°. The axis A is oriented perpendicular to the rotational axis B of the turntable 32.

For rotation of the turntable 32, there is mounted in the wrist housing 12 a first secondary drive shaft 36 which extends through a hole in the longitudinal direction of the housing 12, preferably parallel to the rotational axis B of the turntable 32. The drive shaft 36, which can be axially and radially mounted in a double-row angular contact ball-bearing 38, has an input end 40 on which there is non-rotatably mounted a preferably cylindrical gear 42 which engages a preferably cylindrical driving gear 44 on the end of a first primary drive shaft 46 which is insertable into the wrist housing 12 of the robot arm 24. The other end of the secondary drive shaft 36 is an output end which is in the form of a hypoid pinion 48, which engages a hypoid gear 50, which is rotatably mounted about the axis A perpendicular to the drive shaft 36 and on the outside of the pinion 48. The hypoid pinion 48 and the hypoid gear 50 thus form together a first hypoid gearing. In the hub of the hypoid gear 50 there is non-rotatably mounted a conical drive gear 52, which in turn engages a bevel gear 54 rotatably mounted in the tilt housing 30 and non-rotatably joined to the shaft 34 of the turntable 32.

When the first primary drive shaft 46 in the robot arm 24 is rotated, the rotary movement is thus transmitted via the gearing 44,42 to the secondary drive shaft 36, which in turn, via the first hypoid gearing 48,50 and the angle gearing 52,54 imparts a rotary movement about the axis B to the shaft 34 and thus the turntable 32. The axis B in the neutral position shown in FIG. 1 is coaxial with the center axis C of the primary drive shaft 46. The center axis C is preferably also an axis about which the robot arm 24 itself can rotate.

For pivoting the tilt housing 30 about the axis A in the wrist housing 12, a second secondary drive shaft 56 is also rotatably mounted therein. The secondary drive shaft 56 extends through a hole in the longitudinal direction of the housing 12, preferably parallel to the first secondary drive shaft 36. As is the first secondary drive shaft 36, the second secondary drive shaft 56 is axially and radially mounted in a two-row angular contact ball bearing 58 and has an input end 60 on which there is non-rotatably mounted a preferably cylindrical gear 62, which engages a preferably cylindrical drive gear 64 on the end of a second primary drive shaft 66 in the robot arm 24. The drive gear 64 is disposed coaxial to, but axially spaced from the cylindrical drive gear 44 on the first primary drive shaft 46. In the embodiment shown in the drawing, the cylindrical drive gears 44,64 and the gears 42,62 have an equal number of teeth, and therefore the gear ratio between the respective primary and secondary drive shafts 46,36 and 66,56 is 1:1. The number of teeth and therefore the gear ratio in these gearings can of course be varied as desired.

The other end of the second secondary drive shaft 56 is an output end, which, as is the first secondary drive shaft 36, is in the form of a hypoid pinion 68, which engages a hypoid gear 70 which is rotatably mounted about the axis A perpendicular to the secondary drive shaft 56 and coaxial to the hypoid gear 50 in the first hypoid gearing 48,50. The hypoid gear 50 is located outside the pinion 68. The hypoid gear 70 is securely joined by screws 72 to the tilt housing 30.

As the second primary drive shaft 66, which coaxially encloses the first primary drive shaft 46 in the robot arm 24, rotates, the rotary movement is thus transmitted via the cylindrical gearing 64,62 to the second secondary drive shaft 56, which in turn transmits, via the second hypoid gearing 68,70, the rotation to the tilt housing 30 and the turntable 32 mounted therein about the axis A.

In accordance with a preferred embodiment of the wrist housing 12 of the invention, the center axes D and E of the secondary drive shafts 36,56 and thus their cylindrical gears 42,62 are located (as can be seen in FIG. 2) on the same side of a central midplane F through the coaxial cylindrical drive gears 44,64, so that an imaginary line L, extending through the centers D,E of the gears 42,62, will be spaced from the center C of the coaxial drive gears 44,64. This means that it will be possible to adjust at the same time the gear engagement and thus the clearance between the two cylindrical gear trains 44,42 and 64,62, respectively, by means of a small radial displacement of the entire wrist housing 12 in the direction of the arrow P in FIG. 2. This is achieved by loosening a screw fastener (not shown) between the housing 12 and the arm 24 and placing an adjustment tool (not shown) against the housing 12 to adjust the gear clearance in the gearings to a desired value, preferably with minimum clearance, by radial adjustment of the housing through the holes 26.

The housing 12 is in a preferred embodiment of the invention made in one piece, thus achieving a number of advantages over conventionally divided housings. There will thus be no problems with fitting the halves of the housing when assembling the wrist. It is also simpler to achieve high manufacturing tolerances when machining holes and abutment surfaces in the housing when it is made as one piece. The assembly of gearing, bearings, seals and the like is also facilitated. No screws holding the housing halves together are required, which would otherwise give rise to undesirable movement between the housing halves. Finally, a fewer number of seals are required to prevent dirt from penetrating into the wrist and preventing any oil in the wrist gearings from leaking out from the housing.

What is claimed is:

1. A wrist unit for an industrial robot, comprising a wrist housing detachably mounted to a distal end of a robot arm, the wrist housing including a pivotally mounted tilt housing which supports a rotatably mounted turntable for supporting an external tool, first and second secondary drive shafts rotatably mounted in the wrist housing, said first and second secondary drive shaft each having an input end supporting driven gears for engagement with drive gears respectively located on primary drive shafts in the robot arm, said drive gears being coaxial and axially spaced, the turntable being rotatable about a first axis by the first secondary drive shaft via a respective first gearing, the tilt housing being pivotable about a second axis by the second secondary drive shaft via a respective second gearing, and the first and second axes intersecting, the improvement wherein the driven gears and the drive gears are disposed relative to each other so that an imaginary line, extending through centers of the driven gears, is offset from a centerline of the drive gears, and wherein the wrist housing is radially adjustable on the end of the robot arm for adjusting the gear clearance between the drive gears and the driven gears.

2. The wrist unit according to claim 1 wherein the driven gears and the drive gears are each cylindrical.

3. The wrist unit according to claim 1 wherein the wrist housing is of a single piece construction.

* * * * *